(12) United States Patent
Rocci Denis et al.

(10) Patent No.: US 8,616,006 B2
(45) Date of Patent: Dec. 31, 2013

(54) ADVANCED OPTICS AND OPTICAL ACCESS FOR LASER IGNITION FOR GAS TURBINES INCLUDING AIRCRAFT ENGINES

(75) Inventors: Sara Rocci Denis, Garching bei Munich (DE); Herbert Kopecek, Schwaz (AT); Richard Wade Stickles, Loveland, OH (US); Chukwueloka Obiora Umeh, Hamilton, OH (US); Gabor Ast, Schwaz (AT); Mark Patrick Kelsey, Cincinnati, OH (US); Steven Clayton Vise, Loveland, OH (US); Gary Lee Leonard, Saratoga Springs, NY (US); Shai Birmaher, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/956,207

(22) Filed: Nov. 30, 2010

(65) Prior Publication Data
US 2012/0131927 A1    May 31, 2012

(51) Int. Cl.
*F02C 7/22* (2006.01)
*F02C 7/264* (2006.01)

(52) U.S. Cl.
USPC .......................................... 60/776; 60/39.821

(58) Field of Classification Search
USPC ......... 60/776, 39.821, 212, 256, 286, 39.826, 60/39.06, 39.828; 123/143 R
See application file for complete search history.

(56) References Cited

U.S. PATENT DOCUMENTS

| | | | | |
|---|---|---|---|---|
| 3,427,118 A * | 2/1969 | Kuchelbacher et al. | ...... | 431/258 |
| 3,473,879 A * | 10/1969 | Berberich | ......................... | 431/1 |
| 4,302,933 A * | 12/1981 | Smith | ............................. | 60/761 |
| 4,416,226 A * | 11/1983 | Nishida et al. | ............ | 123/143 B |
| 4,498,292 A | 2/1985 | White | | |
| 4,521,088 A * | 6/1985 | Masom | ........................ | 359/507 |
| 4,852,529 A | 8/1989 | Vowles et al. | | |
| 5,367,869 A * | 11/1994 | DeFreitas | ....................... | 60/776 |
| 5,404,712 A * | 4/1995 | Few et al. | ................... | 60/39.821 |
| 6,394,788 B1 * | 5/2002 | Early et al. | ........................ | 431/1 |
| 7,421,166 B1 * | 9/2008 | Woodruff et al. | ............... | 385/39 |

(Continued)

FOREIGN PATENT DOCUMENTS

| | | |
|---|---|---|
| DE | 10 2008047236 B3 | 6/2010 |
| GB | 2354311 A | 3/2001 |

(Continued)

OTHER PUBLICATIONS

Weinrotter et al., "Laser Ignition of Engines", Laser Physics, vol. 15, Issue 7, pp. 947-953, 2005.

(Continued)

*Primary Examiner* — Gerald L Sung
(74) *Attorney, Agent, or Firm* — Scott J. Asmus (57) ABSTRACT

A laser ignition system for an internal combustion engine, and more specifically a gas turbine engine, is provided. The system including a laser light source configured to generate a laser beam, an ignition port configured to provide optimized optical access of the laser beam to a combustion chamber and an optical beam guidance component disposed between the laser light source and the ignition port. The optical beam guidance component is configured to include optimized optic components to transmit the laser beam to irradiate on a fuel mixture supplied into the combustion chamber to generate a combustor flame in a flame region. A method for igniting a fuel mixture in an internal combustion engine is also presented.

20 Claims, 6 Drawing Sheets

(56) References Cited

U.S. PATENT DOCUMENTS

| | | | |
|---|---|---|---|
| 2004/0123763 A1* | 7/2004 | Englund | 102/201 |
| 2006/0132930 A1* | 6/2006 | Kopecek et al. | 359/718 |
| 2009/0095918 A1* | 4/2009 | Iwase et al. | 250/432 R |
| 2009/0282805 A1 | 11/2009 | Kopecek et al. | |
| 2010/0031909 A1 | 2/2010 | Herden et al. | |

FOREIGN PATENT DOCUMENTS

| | | | | |
|---|---|---|---|---|
| JP | 08193309 A | * | 7/1996 | E01F 9/00 |
| JP | 2005042580 A | | 2/2005 | |
| JP | 2005147109 A | | 6/2005 | |
| JP | 2006 104972 A1 | | 4/2006 | |
| JP | 2006144618 A | * | 6/2006 | |
| JP | 2007291965 A | | 11/2007 | |
| JP | 2007309129 A | | 11/2007 | |
| JP | 2008002409 A | | 1/2008 | |
| JP | 2008258447 A | | 10/2008 | |
| WO | 02/095220 A1 | | 11/2002 | |
| WO | 2005/080788 A1 | | 9/2006 | |
| WO | 2011/032776 A1 | | 3/2011 | |

OTHER PUBLICATIONS

Herdin et al., "Laser Ignition—a New Concept to Use and Increase the Potentials of Gas Engines", ASME Conference Proceedings, pp. 673-681, Sep. 11-14, 2005.

Morsy et al., "Laser-induced Multi-point Ignition with a Single-shot Laser using Two Conical Cavities for Hydrogen/Air Mixture", Experimental Thermal and Fluid Science, vol. 27, Issue 4, pp. 491-497, Apr. 2003.

El-Rabii et al., "Laser Ignition of Flammable Mixtures via a Solid Core Optical Fiber", Applied Physics B: Lasers and Optics, vol. 87, Issue 1, pp. 139-144, 2007.

Search Report and Written Opinion from corresponding EP Application No. 11189129.7-2311 dated May 7, 2012.

\* cited by examiner

ADVANCED OPTICS AND OPTICAL ACCESS FOR LASER IGNITION FOR GAS TURBINES INCLUDING AIRCRAFT ENGINES

BACKGROUND

This invention relates generally to ignition systems for internal combustion engines. More particularly, this invention relates to laser ignition systems and features that optimize the optics and optical access included in a laser ignition system, for internal combustion engines.

For internal combustion engines, fuel is combusted with an oxidizer (usually air) in combustion chambers. The resulting high temperature and pressure gases expand and thereby apply forces to movable components of the engines, such as turbine blades to drive the turbine. Combustion can be intermittent (as for example, in automotive applications) or continuous (as for example, in gas turbines and jet engines).

In a conventional ignition apparatus for internal combustion engines, a high voltage is applied to an ignition plug that is fixed on a wall surface of the combustion chamber in order to ignite an air-fuel mixture by spark discharge. However, in an ignition apparatus of this kind, since the ignition plug is exposed directly to the combustion chamber, carbon attaches to the ignition plug to render the discharge of the ignition plug difficult. In addition, electrode erosion may be of concern in this type of configuration. Furthermore, due to a heat loss of the electrodes of the ignition plug, a torch or nucleus of flame generated by the discharge is cooled, and vanishes before reaching a flame. Additionally, since the ignition occurs on or very near the wall surface, a high fuel fraction close to the combustor wall often results due to the difficulties associated with burning fuel from the wall surface.

Engines that use combustible fuel such as, for example, gas turbine engines and other internal combustion engines include combustion areas such as, for example, combustors or cylinder and piston assemblies that facilitate the conversion of energy from combustion into mechanical energy. Fuel nozzles are used to introduce atomized fuel into the combustion areas. The atomized fuel is ignited by an igniter. Igniters may include, for example, electrical igniters that create a spark proximate to the atomized fuel, heating elements that introduce heat to the atomized fuel, and igniters that introduce a flame in the combustion area, such as laser igniters. In an attempt to enhance laser ignition of the fuel in the combustion chamber, optimizing the associated optics and optical access utilized during ignition is desired.

Accordingly, there is a need for a new and improved laser ignition system and method for internal combustion engines in which optimized optics and optical access are provided in an attempt to improving ignitability within the combustion region.

BRIEF DESCRIPTION

A combustion engine system is provided in accordance with one embodiment of the invention. The combustion engine system comprises an engine including a combustion chamber; at least one laser light source configured to generate a laser beam; and an ignition port, formed in a combustor wall defining the combustion chamber and adjacent to a flame region in the combustion chamber. The ignition port is further configured to provide optimized optical access to the combustion chamber. The combustion engine system further comprised at least one fuel nozzle operative to transmit a fuel into the combustion chamber and an optical beam guidance component disposed between the at least one laser light source and the ignition port. The optical beam guidance component is configured to include optimized optic components to guide light emitted from the at least one laser light source to the combustion chamber. The laser beam is operative to ignite the fuel in the combustion chamber.

Another embodiment of the invention is directed to combustion engine system comprising an engine including a combustion chamber; at least one laser light source configured to generate a laser beam; and a windowless ignition port, formed in a combustor wall defining the combustion chamber and adjacent to a flame region in the combustion chamber. The windowless ignition port is configured to provide optimized optical access to the combustion chamber. The system further comprises a fuel nozzle operative to transmit a fuel into the combustion chamber and an optical beam guidance component disposed between the at least one laser light source and the windowless ignition port. The optical beam guidance component is configured to include optimized optic components to guide light emitted from the at least one laser light source to the combustion chamber. The laser beam is operative to ignite the fuel in the combustion chamber.

Another embodiment of the invention is direct to a method for igniting a fuel mixture in an internal combustion engine. The method comprising generating at least one laser beam with at least one laser light source; transmitting the at least one laser beam through at least one optical beam guidance component configured to include optimized optic components to guide light emitted from the at least one laser light source to the combustion chamber; and transmitting the laser beam through a windowless ignition port configured to provide optimized optical access to the combustion chamber. The step of transmitting the at least one laser beam includes focusing the at least one laser beam on the fuel mixture supplied into a combustion chamber of the internal combustion engine. The method further comprising igniting the fuel mixture with the focused laser beam to generate a combustor flame in a flame region.

These and other advantages and features will be better understood from the following detailed description of preferred embodiments of the invention that is provided in connection with the accompanying drawings.

BRIEF DESCRIPTION OF THE DRAWINGS

The above and other aspects, features, and advantages of the present disclosure will become more apparent in light of the subsequent detailed description when taken in conjunction with the accompanying drawings in which.

DETAILED DESCRIPTION

Embodiments of the present disclosure are described herein with reference to the accompanying drawings. In the subsequent description, well-known functions or constructions are not described in detail to avoid obscuring the disclosure in unnecessary detail.

Figure 1:
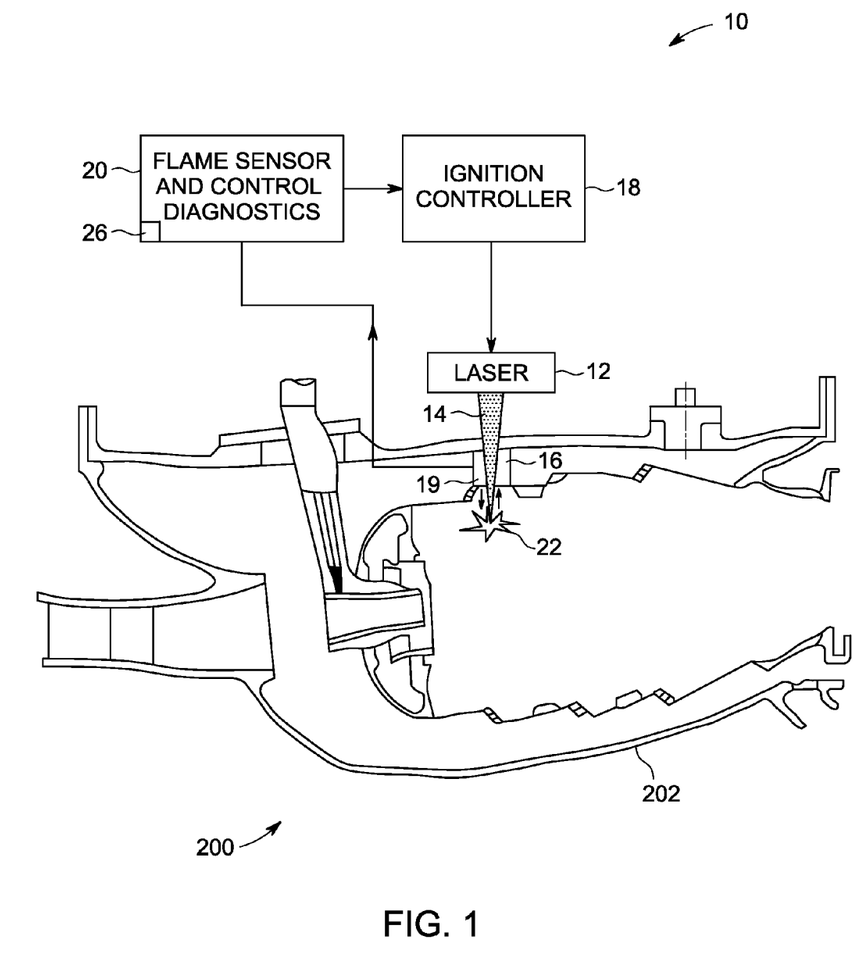
FIG. 1 is a schematic diagram of a gas turbine including a laser ignition system in accordance with an embodiment.

FIG. 1 illustrates a schematic diagram of an enhanced laser ignition system 10 in accordance with an embodiment of the invention. In embodiments of the invention, the laser ignition system 10 is configured to generate and guide a laser beam to focus into a chamber, such as a combustion chamber 202 of an internal combustion engine 200 to ignite combustive mediums, such as an oxygenated fuel mixture therein. In addition, the laser ignition system is configured to provide emission diagnostics to detect ignition and flame out and assess local mixture composition, flame propagation and emissions within the combustion chamber 202. As used herein, the phrase "internal combustion engine" encompasses engines with continuous combustion and engines with intermittent combustion. Non-limiting examples of the internal combustion engine 200 includes a reciprocating engine, a gas turbine engine, a jet engine, a diesel engine, and a rotary engine.

As illustrated in FIG. 1, the laser ignition system 10 comprises the at least one laser light source 12 configured to generate a laser beam 14 and an optical beam guidance component 16 in optical communication with the at least one laser light source 12 and configured to guide the laser beam 14 from the at least one laser light source 12 to focus into the combustion chamber 202 of the internal combustion engine 200 to provide enhanced ignition. Further, the laser ignition system 10 comprises an ignition controller 18 coupled to the at least one laser light source 12 to control the generation of the laser beam 14 from the at least one laser light source 12 and a flame sensor and may optionally include a control diagnostics 20 for detecting the transmitted emission of the combustor flame and controlling combustion parameters associated with the laser beam 14.

In the illustrated arrangement, the ignition controller 18 is separated from the at least one laser light source 12. Alternatively, the ignition controller 18 may be integral with the at least one laser light source 12. It should be noted that this disclosure is not limited to any particular controller for performing the processing tasks of the invention. The term "controller", as that term is used herein, is intended to denote any machine capable of performing the calculations, or computations, necessary to perform the tasks of the invention. The term "controller" is intended to denote any machine that is capable of accepting a structured input and of processing the input in accordance with prescribed rules to produce an output, as will be understood by those skilled in the art. In addition, the ignition controller 18 may provide power to the at least one laser light source 12.

In some applications, the ignition controller 18 may accept ignition requests from pilots and/or be operated based on engine operational parameters, such as crank angles, speeds, engine operational temperatures, accelerator positions, exhaust quality, and measured fuel variables, etc. Accordingly, in some examples, one or more detection units, such as photodetectors (not shown) know in the art may be provided to sense the operational parameters of the internal combustion engine 200, and may relay corresponding information to the ignition controller 18 to control the generation and/or focusing of the laser beam 14.

In one non-limiting example, the ignition controller 18 may include a laser control circuit and/or an ignition timing control circuit. As is known in the art, the laser control circuit may synchronize laser oscillations with the ignition timing. The ignition timing control circuit may include a control circuit that includes an ignition timing calculating circuit that calculates the ignition timing based on detected engine operational conditions. Further description of such example control units may be found in U.S. Pat. No. 4,416,226, entitled "Laser ignition apparatus for an internal combustion engine," which is assigned to the same assignee and incorporated by reference herein. In certain applications, an Electronic Control Unit (ECU) may be used as the ignition controller 18, or in conjunction with the ignition controller 18.

In some embodiments, the at least one laser light source 12 may be any laser apparatus know in the art that is capable of emitting sufficient energy, so that the energy may focus into the combustion chamber 202 of the internal combustion engine 200 to ignite the combustive mediums, such as fuel, fuel-air mixtures or premixed mixtures therein. Examples of the at least one laser light source 12 include, but are not limited to, Neodymium-type lasers, Erbium-type lasers, other solid-state lasers, or other suitable lasers such as semiconductor lasers.

In some embodiments, the laser ignition process may take place by any one or combination of at least three ignition mechanisms including, but not limited to, photochemical ignition, thermal ignition, and laser-induced spark ignition.

In photochemical ignition, laser photons dissociate target molecules, such as the fuel or fuel-air mixtures, into highly reactive radical species. These radicals then initiate a rapid chemical chain reaction, or combustion. As is known in the art, photochemical ignition requires a close match between the laser excitation wavelength and the target molecule's absorption wavelength in order for dissociation to occur.

Thermal ignition uses a laser to increase kinetic energy, in translational, rational, or vibrational form, of target molecules. As a result, molecular bonds are broken and chemical reactions can take place. This mechanism may be used to ignite combustibles in combinations of solid, liquid, and gas phases. Heating of the material with this technique may be performed with infrared lasers.

In laser-induced spark ignition, a laser beam is focused to create a plasma kernel, or spark. Such spark emits light, heat, and a shock wave to the surrounding medium, supplying energy to initiate combustion. The laser-induced spark ignition may primarily constitute a thermal chemical process, in which the heat generated in both the laser spark and the shock wave is used for ignition.

As depicted in FIG. 1, the optical beam guidance component 16 is disposed on the internal combustion engine 200 and is in communication with the combustion chamber 202. More particularly, the optical beam guidance component 16 may be positioned in a combustor wall of the combustion chamber 202 and may include an optical window (described presently). The laser beam 14 from the at least one laser light source 12 may pass through the optical beam guidance component 16 and may be focused, imaged, or transformed by one or more optics 17, such as one or more lenses, prisms, or the like, housed within the optical beam guidance component 16. According to example embodiments of the invention, the one or more optics 17 may be moveable in order to focus and/or steer the laser beam 14. Thus, the laser beam 14 from the at least one laser light source 12 may be guided and focused by the optical beam guidance component 16 into the combustion chamber 202 to ignite the fuel and fuel-air mixtures therein.

The laser ignition system 10 illustrated in FIG. 1 may further include a means in which combustion parameters are measured in the combustion chamber 202 of the internal combustion engine 200 by selectively detecting spatial, temporal, and/or spectral light emissions from combustor burner flames. According to embodiments of the invention, the measured combustion parameters may in turn be utilized to control various parameters of the internal combustion engine 200, including, but not limited to fuel flow rates, fuel/air ratios, and fuel flow distributions to optimize nitrous oxide emissions, dynamic pressure oscillations, and fuel efficiencies, air/fuel ratio, combustion flame oscillations, combustion flame extinction, heat release ratio, or flame temperature. Further description of such example combustion engines including means in which combustion parameters are measured may be found in U.S. pending patent application bearing Ser. No. 12/484,447 and attorney docket number 234852-1, entitled "Optical Sensors for Combustion Control," which is assigned to the same assignee and incorporated by reference herein.

Figure 2:
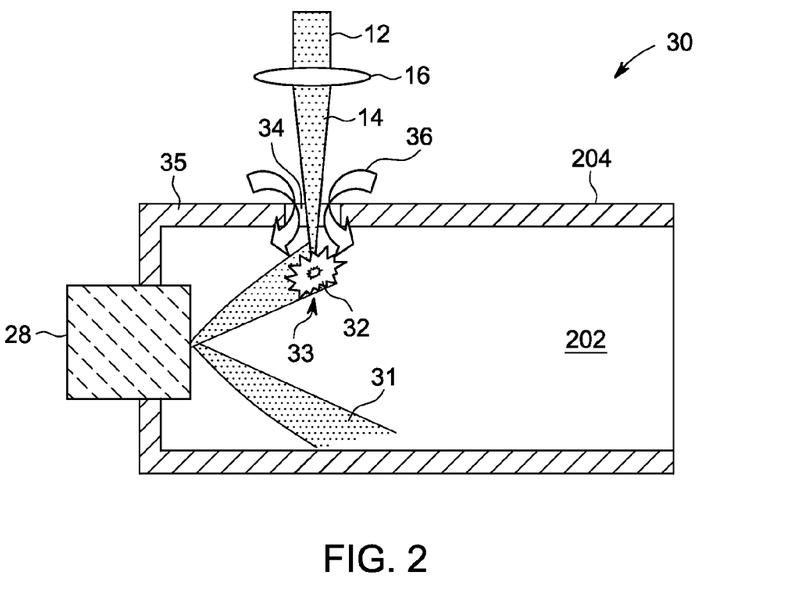
FIG. 2 is a schematic diagram of a laser ignition system in accordance with an embodiment.
Figure 3:
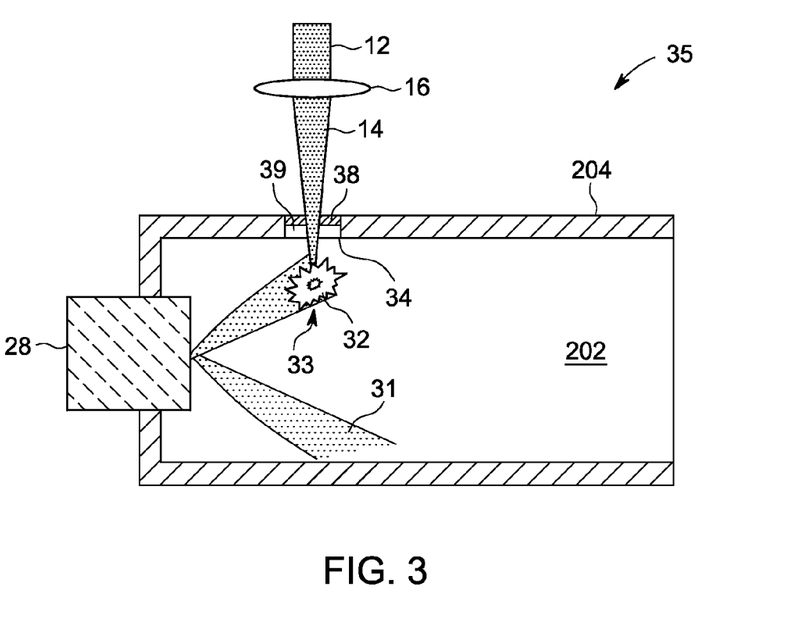
FIG. 3 is a schematic diagram of a laser ignition system in accordance with an embodiment.

Referring now to FIGS. 2 and 3, illustrated in schematic diagrams is a laser ignition system including optimized optical access in accordance with embodiments. For ease of illustration, the same numerals may be used to indicate similar elements in the figures. It should be noted that depicted arrangements in FIGS. 2- and 3 are merely illustrative. Illustrated in FIG. 2 is a laser ignition system 30, configured generally similar to the laser ignition 10, described in reference to FIG. 1 and having a port 34 formed in a combustor wall 35 through which the laser beam 14 passes.

In the depicted embodiment, provided are a plurality of fuel nozzles 28, of which only one is shown, in the internal combustion engine 200 (FIG. 1). The fuel nozzle 28 is illustrated to show a spray of the combustive mediums 31, as well as ignition position(s) of the laser beam 14 within the combustion chamber 202. Depicted is a laser arrangement wherein the nozzles 28 are configured in optical alignment with the laser light source 12, and capable of receiving an emitted laser beam 14. As previously described with regard to FIG. 1, an optical beam guidance component 16 is configured proximate an outer liner 204 of the combustion chamber 202.

To provide enhanced ignition, the laser beam 14 is transmitted to irradiate on the oxygenated fuel mixture, or combustive medium, 31 supplied into the combustion chamber 202, via a laser spark 32, to generate a combustor flame in a flame region 33. As best illustrated in FIG. 2, the laser beam 14 is directed by the optical beam guidance component 16 to generate the laser spark 32 in a location that corresponds to the flame region 33 under normal operating conditions.

In this exemplary embodiment, the laser beam 14 is guided by the optical beam guidance component 16 through the port 34 formed in the combustor wall 35. The port 34 is configured as an opening in the combustor wall 35, and may be referred to herein as a windowless port. As illustrated in FIG. 1, a purge air or gas 36 is utilized to create a positive pressure differential between the interior and exterior of the combustion chamber 202. This pressure difference allows for no air to exit the combustor chamber 202 through the windowless port 34.

It is well known that optical access to the combustion chamber 202 is an important aspect of a laser ignition system for combustion engines and gas turbine applications. Any kind of deposit on a window surface that leads into the combustion chamber 202 can negatively effect beam propagation through the window, and as a consequence, ignition performance of the laser beam 14. In the embodiment illustrated in FIG. 1, in that port 34 does not implement a window at the combustor wall 35, there is no resulting window wetting by the combustive medium 31, fouling, sooting or other damage that may affect the performance of the laser ignition system 30. The windowless port 34 provides improved optical access, performance and increased reliability of the laser ignition system 30, including enhanced high altitude relight and lower emissions.

Referring now to FIG. 3, illustrated is a laser ignition system 35, configured generally similar to the laser ignition 10, described in reference to FIG. 1 and having a port 34 formed in a combustor wall 35, generally similar to the embodiment disclosed in FIG. 2, through which the laser beam 14 passes.

In contrast to the embodiment of FIG. 2, in this exemplary embodiment, the port 34 is configured to include a window 38 having a coating 39 applied thereto. More specifically, provided are a plurality of fuel nozzles 28, of which only one is shown, in the internal combustion engine 200 (FIG. 1). The fuel nozzle 28 is illustrated to show a spray of the combustive mediums 31, as well as ignition position(s) of the laser beam 14 within the combustion chamber 202. Depicted is a laser arrangement wherein the nozzles 28 are configured in optical alignment with the laser light source 12, and capable of receiving an emitted laser beam 14. As previously described with regard to FIG. 1, an optical beam guidance component 16 is configured proximate an outer liner 204 of the combustion chamber 202.

In this exemplary embodiment, the laser beam 14 is guided by the optical beam guidance component 16 through the port 34 formed in the combustor wall 35. As previously described, the port 34 is formed as an opening in the combustor wall 35, and includes window 38 positioned therein. The window 38 has applied thereto the coating 39, which in a preferred embodiment is a catalytic coating, that aids in keeping the surface(s) of the window 38 clean. In a preferred embodiment, the window 38 is formed having a crystalline or an amorphous surface. As previously described, any kind of deposit on a window surface that leads into the combustion chamber 202 can negatively effect beam propagation through the window 38, and as a consequence, ignition performance of the laser beam 14. The coating 39 minimizes any negative effects on beam propagation through the window 38. In a preferred embodiment, the coating 39 is formed on a surface of the window 39 nearest the combustion chamber 202 to minimize any deposits from the combustion medium 31 on the window 38 surface proximate thereto. The coating 39 on the window 38 provides improved performance and increased reliability of the laser ignition system 35, including enhanced high altitude relight and lower emissions.

Figure 4:
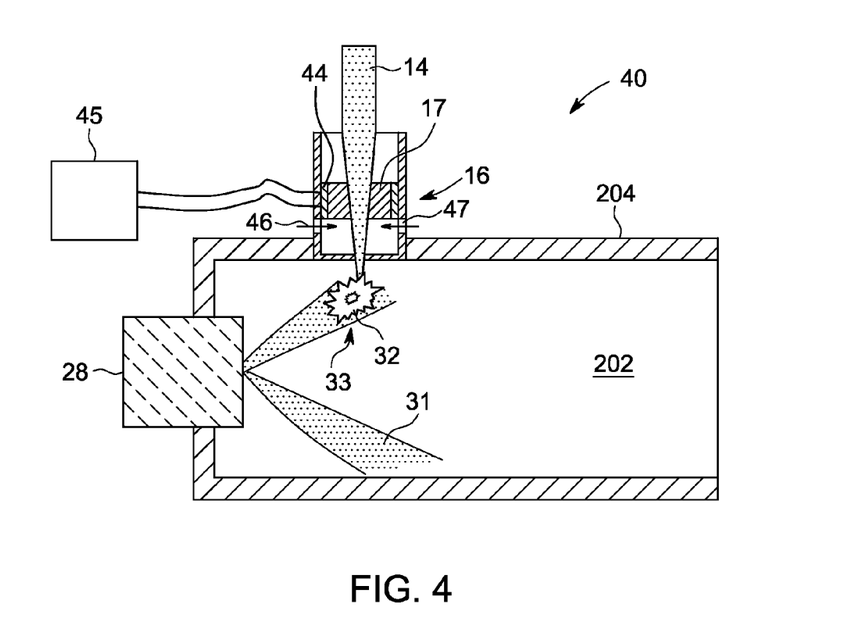
FIG. 4 is a schematic diagram of a laser ignition system in accordance with an embodiment.
Figure 5:
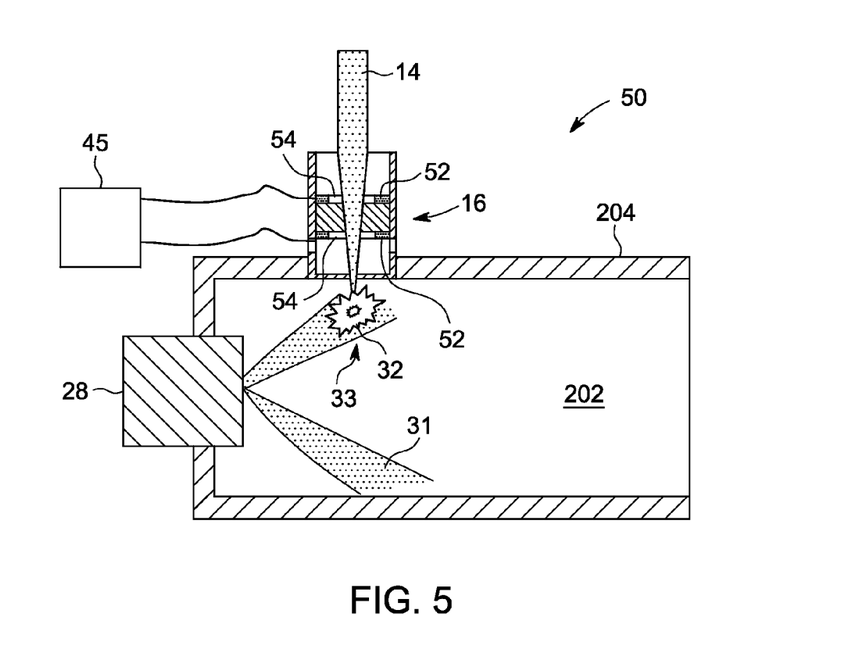
FIG. 5 is a schematic diagram of a laser ignition system in accordance with an embodiment.
Figure 6:
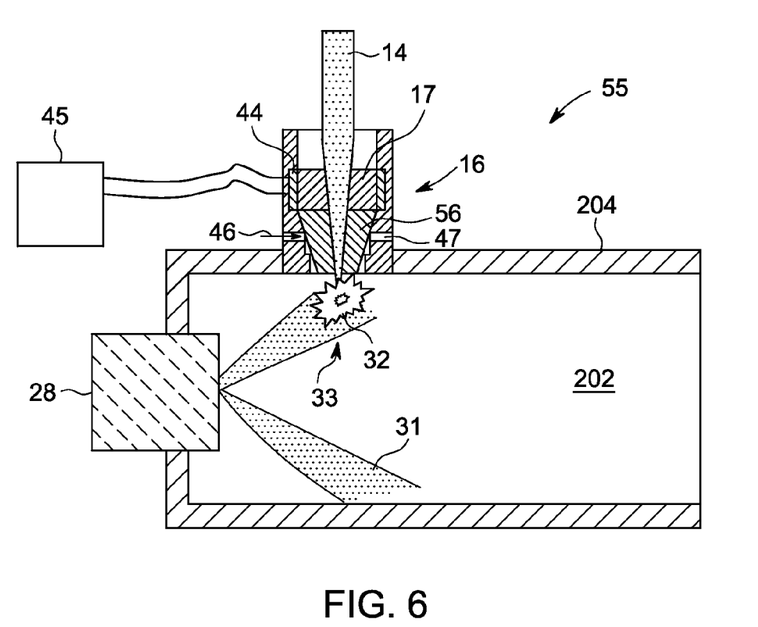
FIG. 6 is a schematic diagram of a laser ignition system in accordance with an embodiment.

Referring now to FIGS. 4-6, illustrated in schematic diagrams is a laser ignition system including optimized optics in accordance with embodiments. For ease of illustration, the same numerals may be used to indicate similar elements in the figures. It should be noted that depicted arrangements in FIGS. 4-6 are merely illustrative. Illustrated in FIG. 4 is a laser ignition system 40, configured generally similar to the laser ignition 10, described in reference to FIG. 1 and having included, advanced optics for laser ignition.

In the depicted embodiment, provided are a plurality of fuel nozzles 28, of which only one is shown. The fuel nozzle 28 is illustrated to show a spray of the combustive mediums 31, as well as ignition position(s) of the laser beam 14 within the combustion chamber 202. Depicted is a laser arrangement wherein the nozzles 28 are configured in optical alignment with the laser light source 12, and capable of receiving an emitted laser beam 14. As previously described with regard to FIG. 1, an optical beam guidance component 16 is configured proximate an outer liner 204 of the combustion chamber 202.

To provide enhanced ignition, the laser beam 14 is transmitted to irradiate on the oxygenated fuel mixture, or combustive medium, 31 supplied into the combustion chamber 202, via a laser spark 32, to generate a combustor flame in a flame region 33. As best illustrated in FIG. 4, the laser beam 14 is directed by the optical beam guidance component 16 to generate the laser spark 32 in a location that corresponds to the flame region 33 under normal operating conditions.

In one non-limiting example, during operation, the optics 17 housed within the optical beam guidance component 16 focus and guide the laser beam 14 towards the nozzle 28 to enter into the combustion chamber 202 and ignite the oxygenated fuel mixture 31 sprayed from the nozzle 28 at the desired location(s). The optics 17 housed within the optical beam guidance component 16, may comprise diffractive components, moving prisms, moving mirrors, optoacoustic switches and/or polarization-based optics. More specifically, the optical beam guidance component 16 may include a conventional lens, or any lens with high efficiency, and good focus that is suitable for relaying the laser beam 14 to ignite the combustive medium 31 within the combustion chamber 202.

In the embodiments illustrated in FIGS. 4-6, the optical beam guidance component 16 may further include a pre-heating system 42 formed proximate the optics 17, or integral therewith. In the exemplary embodiment illustrated in FIG. 4, illustrated is an optics pre-heating system 42, generally comprised of an electric heater 44 coupled to a power supply 45. During operation, the optics pre-heating system 42, in conjunction with cylindrical optics 17, such as a window, lens, prism, or the like, provides enhanced ignition of the laser ignition system 40. In addition, the optics pre-heating system 42 prevents optic wetting due to impinging fuel or other liquids. The optic pre-heating system 42 may further include a purge air or gas 46 incorporated via openings 47 to prevent fuel stagnation on a surface of the optics 17. As illustrated in FIG. 4, during operation the purge air or gas 46 enters the laser ignition system 40 and minimizes the accumulation of any deposits from the combustion medium 31 on a surface of the optics 17.

Referring now to FIG. 5, illustrated is a laser ignition system 50, configured generally similar to the laser ignition 10, described in reference to FIG. 1, and having advanced optics for laser ignition. In this exemplary embodiment, included are an optics pre-heating system 42 formed proximate or integral with an optical beam guidance component 16, generally similar to the embodiment disclosed in FIG. 4, through which the laser beam 14 passes. In contrast to the embodiment of FIG. 4, the optics pre-heating system 42 is configured to include a plurality of heating rings 52 positioned proximate the cylindrical optics 17. The plurality of heating rings 52 are formed generally annular in configuration having a central opening 52 through with the laser beam 14 passes.

During operation, the optics pre-heating system 42, including the plurality of heating rings 52, in conjunction with the cylindrical optics 17, such as a window, lens, prism, or the like, provides enhanced ignition of the laser ignition system 50. Similar to the previous embodiment, the optics pre-heating system 42 prevents optic wetting due to impinging fuel or other liquids. In conjunction with the optic pre-heating system 42, a purge air or gas 46 may be incorporated via openings 47 to prevent fuel stagnation on a surface of the optics 17.

Referring now to FIG. 6, illustrated is a laser ignition system 55, configured generally similar to the laser ignition 10, described in reference to FIG. 1, and having advanced optics for laser ignition. In this exemplary embodiment, included is an optics pre-heating system 42 formed proximate or integral with an optical beam guidance component 16, generally similar to the embodiment disclosed in FIG. 4, through which the laser beam 14 passes. More specifically, the optics preheating system 42 is configured to include an electric heater 44 positioned about the cylindrical optics 17. In an alternate embodiment, the optics preheating system 42 may be configured to include a plurality of heating rings 52, such as those described with reference to FIG. 5. In contrast to the embodiments of FIGS. 4 and 5, in this exemplary embodiment the optical beam guidance component 16 further includes a conical optical element 56 configured proximate the combustor wall 35. The conical optical element 56 provides advantages in terms of improved purge flow. It also allows for higher tip temperature for faster burn off of any deposits on the window surface.

During operation, the optics pre-heating system 42, including the electric heater 44, in conjunction with the cylindrical optics 17 and the conical optical element 56, provides enhanced ignition of the laser ignition system 60. Similar to the previous embodiment, the optics pre-heating system 42 prevents optic wetting due to impinging fuel or other liquids. In conjunction with the optic pre-heating system 42, a purge air or gas 46 may be incorporated via openings 47 to prevent fuel stagnation on a surface of the conical optical element 56.

Figure 7:
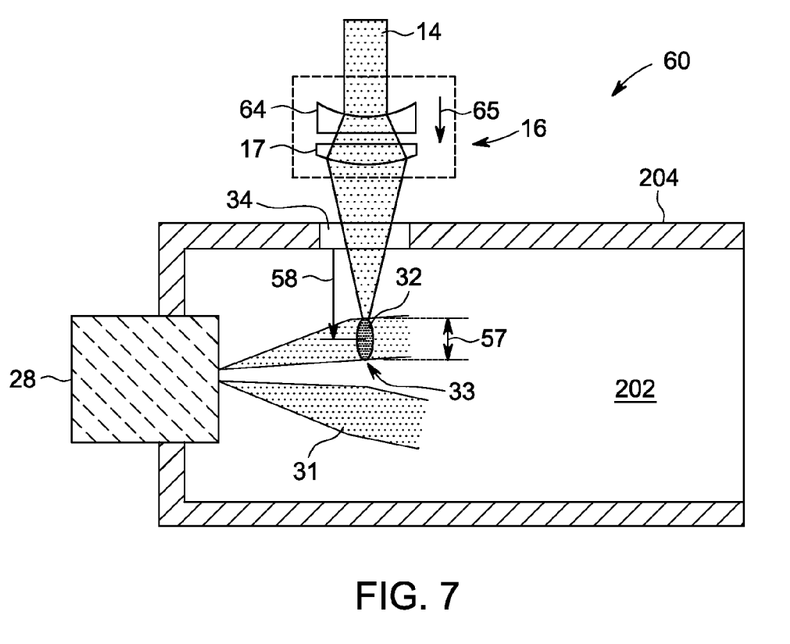
FIG. 7 is a schematic diagram of a laser ignition system in accordance with another embodiment.

Referring now to FIGS. 7-10, illustrated in schematic diagrams is a laser ignition system including advanced optics and optical access in accordance with embodiments. For ease of illustration, the same numerals may be used to indicate similar elements in the figures. It should be noted that depicted arrangements in FIGS. 7-10 are merely illustrative. Referring now to FIG. 7, illustrated is a laser ignition system 60, configured generally similar to the laser ignition 10, described in reference to FIG. 1 and having included, advanced optics to provide for a variable spark shape (length vs. width) and spark volume.

In the depicted embodiment, the laser ignition system 60 includes a plurality of fuel nozzles 28, of which only one is shown, in the internal combustion engine 200 (FIG. 1). The fuel nozzle 28 is illustrated to show a spray of the combustive mediums 31, as well as ignition position(s) of the laser beam 14 within the combustion chamber 202. As previously described with regard to FIG. 1, an optical beam guidance component 16 is configured proximate an outer liner 204 of the combustion chamber 202.

To provide enhanced ignition, the laser beam 14 is transmitted to irradiate on the oxygenated fuel mixture, or combustive medium, 31 supplied into the combustion chamber 202, via a laser spark 32, to generate a combustor flame in a flame region 33. As illustrated in FIG. 7, the laser beam 14 is guided by the optical beam guidance component 16 to generate the laser spark 32 in a location that corresponds to the flame region 33 under normal operating conditions.

In this exemplary embodiment, the laser beam 14 is guided by the optical beam guidance component 16 through a port 34 formed in the combustor wall 35 that may be formed either inclusive of a window as previously described with reference to FIG. 3 or windowless as previously described with reference to FIG. 2. Included in the optical beam guidance component 16, through which the laser beam 14 passes, are a plurality of optics 17 configured to optimize the laser spark 32 shape and improve ignitability. More specifically, the optical beam guidance component 16, and more particularly optics 17, includes a diffractive optical component 62, such as a concave or convex lens 64, that provides for optimization of the laser spark 32 via advanced optics.

During operation, by moving the concave lens 64, as generally indicated by an arrow 65, in an axial direction relative to the ignition port 34, a spark length 57 and a spark position 58 can be adapted. This optimizing of the spark length 57 and spark position 58 provides for increased control and ignitability of the combustion medium 31.

Figure 8:
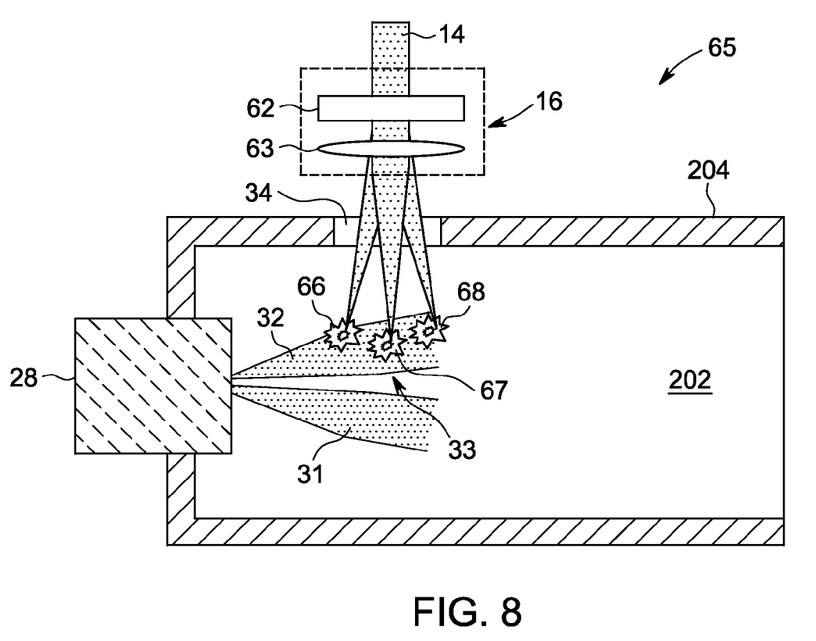
FIG. 8 is a schematic diagram of a laser ignition system in accordance with another embodiment.
Figure 9:
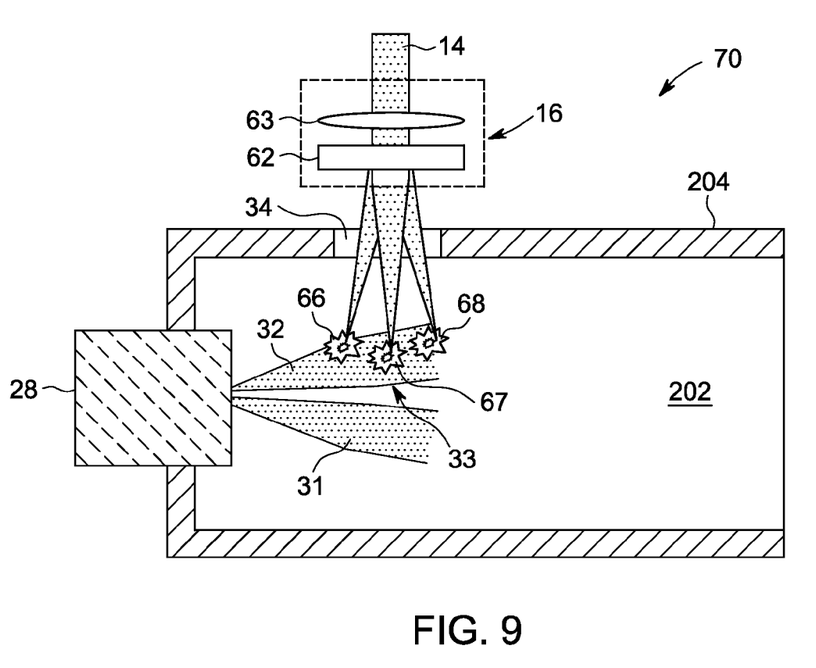
FIG. 9 is a schematic diagram of a laser ignition system in accordance with another embodiment.
Figure 10:
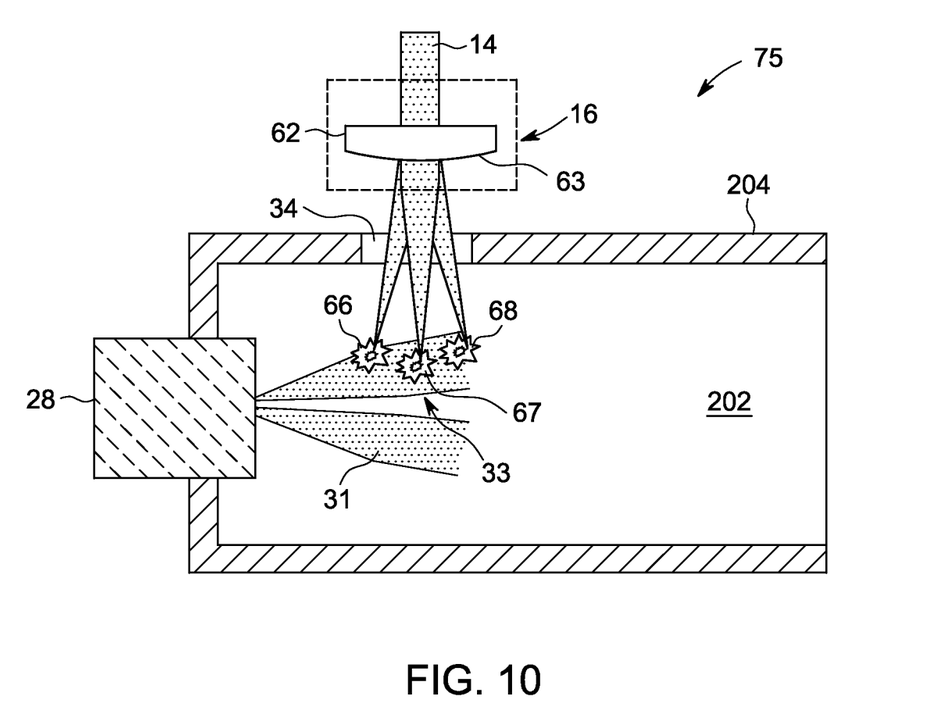
FIG. 10 is a schematic diagram of a laser ignition system in accordance with another embodiment.

Referring now to FIGS. 8-10 illustrated are various configurations of the optics 17, included within the optical beam guidance component 16, that provide for optimization of the laser ignition system and increased ignitability of the combustion medium 31. More specifically, illustrated in schematic diagrams are various configurations of a laser ignition system 65, 70, and 75, respectively, in accordance with embodiments and configured generally similar to the laser ignition 10, described in reference to FIG. 1.

In the depicted embodiments, provided are a plurality of fuel nozzles 28, of which only one is shown, in the internal combustion engine 200 (FIG. 1). The fuel nozzle 28 is illustrated to show a spray of the combustive mediums 31, as well as ignition position(s) of the laser beam 14 within the combustion chamber 202. Depicted are laser arrangements wherein the nozzles 28 are configured to receive an emitted laser beam 14. As previously described with regard to FIG. 1, an optical beam guidance component 16 is configured proximate an outer liner 204 of the combustion chamber 202.

As illustrated in FIGS. 8-10, the optic beam guidance component 16 includes various optic configurations to provide for multipoint ignition sparks inside the combustion chamber 202. More particularly, illustrated in FIGS. 8-10 is the optic beam guidance component 16 in which configured are a plurality of optics 17, including a diffractive optical component 62 and a focusing lens 63, generally similar to the embodiment described in FIG. 7. In non-limiting examples, during operation, the optics housed within each of the optical beam guidance components 16 focuses and transmits the laser beam 14 towards their respective nozzle 30 to enter into the combustion chamber 202 and ignite the combustive medium sprayed from the nozzle 30 at desired location(s). The optics 17 housed within the optical beam guidance components 16, may comprise the focusing lens 63, or any lens with high efficiency, and good focus that is suitable for relaying the laser beam 14 to ignite the combustive medium at ignition location(s) within the combustion chamber 202. Each of the optical beam guidance components 16 is additionally configured to include the diffractive optical element 62 in the laser beam 14 path, configured to diffract at least a portion of the laser light passing therethrough and provide for multipoint ignition sparks 66, 67, and 68. The multipoint ignition sparks optimize the laser ignition systems 65, 70, and 75 and provide for increased ignitability.

FIG. 8 illustrates the diffractive optical element 62 positioned to provide for the passage therethrough of the laser beam 14, prior to focusing of the laser beam when passing through the focusing lens 63. FIG. 9 illustrates the focusing lens 63 positioned to provide for the passage therethrough and focusing of the laser beam 14, prior to passing through the diffractive optical element 62. FIG. 10 illustrates the diffractive optical element 62 and the focusing lens 63 formed as a single optical element and positioned to provide for the passage therethrough of the laser beam 14. By guiding the laser beam 14 through the optical beam guidance component including the diffractive optical element 62, multipoint ignition sparks 66, 67, and 68 are created.

Accordingly, described are advanced optics and optical access for laser ignition systems for an internal combustion engine, and more particularly a gas turbine engine, in which, amongst other things, an optical beam guidance component is optimized to provide improved reliability and ignitability, shorter response time to flame outs in the form of immediate relight capabilities, and improved combustion control, thus flame stability, at very lean conditions.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the subsequent claims.

What is claimed is:

1. A combustion engine system comprising:
an engine including a combustion chamber;
at least one laser light source configured to generate a laser beam;
a windowless ignition port, formed in a combustor wall defining the combustion chamber and adjacent to a flame region in the combustion chamber, the windowless ignition port configured to provide optimized optical access to the combustion chamber;
at least one fuel nozzle operative to transmit a combustive medium into the combustion chamber; and
an optical beam guidance component coupled to the at least one laser light source at a first end to provide mechanical alignment of the at least one laser light source and the windowless ignition port formed in the combustor wall, the at least one laser light source spaced from the windowless ignition port so as to allow fluid communication to create a positive pressure differential between the exterior and interior through the windowless ignition port, the optical beam guidance component configured to include optimized optic components to align the laser beam emitted from the at least one laser light source with the windowless ignition port,
wherein the laser beam is operative to ignite the combustive medium in the combustion chamber.

2. The system of claim 1, wherein the windowless ignition port further includes a purge system configured to provide one of a purged air or gas into the combustion chamber, through the windowless port, to generate a positive pressure differential between an exterior of the combustion chamber and an interior of the combustion chamber.

3. The system of claim 1, wherein the optical beam guidance component includes one or more focusing optics operative to focus the laser beam into the combustion chamber and one or more diffractive optics.

4. The system of claim 3, wherein the one or more diffractive optics are configured to diffract at least a portion of the laser beam and provide multiple ignition sparks for multipoint ignition in the combustion chamber.

5. The system of claim 3, wherein the one or more diffractive optics are configured to provide a variable spark length and a variable spark position in the combustion chamber.

6. The system of claim 5, wherein the optical beam guidance component includes at least one lens element moveable in an axial direction relative to the windowless ignition port to vary one or more of the variable spark length and the variable spark position.

7. The system of claim 1, further including a purge system configured to provide one of a purged air or gas into the combustion chamber.

8. The system of claim 1, further including an optics pre-heating system coupled to the optical beam guidance component to support laser ignition.

9. The system of claim 8, wherein the optical beam guidance component includes cylindrical optics positioned adjacent one or more electric heating elements.

10. The system of claim 1, wherein the combustion engine is a gas turbine engine.

11. A combustion engine system comprising:
an engine including a combustion chamber;
at least one laser light source configured to generate a laser beam;
a windowless ignition port, formed in a combustor wall defining the combustion chamber and adjacent to a flame region in the combustion chamber, the windowless ignition port configured to provide optimized optical access to the combustion chamber;
a fuel nozzle operative to transmit a combustive medium into the combustion chamber; and
an optical beam guidance component coupled to the at least one laser light source at a first end to provide mechanical alignment of the at least one laser light source and the windowless ignition port formed in the combustor wall, the at least one laser light source spaced from the windowless ignition port so as to allow fluid communication to create a positive pressure differential between the exterior and interior through the windowless ignition port, the optical beam guidance component configured to include optimized optic components to align the laser beam emitted from the at least one laser light source with the windowless ignition port,
wherein the laser beam is operative to ignite the combustive medium in the combustion chamber.

12. The system of claim 11, wherein the windowless ignition port further includes a purge system configured to provide one of a purged air or gas into the combustion chamber through the windowless ignition port, to generate a positive pressure differential between an exterior of the combustion chamber and an interior of the combustion chamber.

13. The system of claim 11, wherein the optical beam guidance component includes focusing optics operative to focus at least a portion of the laser beam into the combustion chamber and one or more diffractive optical elements operative to diffract at least a portion of the laser beam.

14. The system of claim 13, wherein the one or more diffractive optical elements is configured to provide multiple ignition sparks for multipoint ignition in the combustion chamber.

15. The system of claim 13, wherein the one or more diffractive optical elements is operable to provide one or more of a variable spark length and a variable spark position.

16. The system of claim 11, further including an optics pre-heating system coupled to the optical beam guidance component to support laser ignition.

17. The system of claim 11, further including a purge system configured to provide one of a purged air or gas into the combustion chamber.

18. The system of claim 11, wherein the combustion engine is a gas turbine engine.

19. A method for igniting a fuel mixture in an internal combustion engine, the method comprising:
generating at least one laser beam with at least one laser light source;
transmitting the at least one laser beam through at least one optical beam guidance component coupled to the at least one laser light source at a first end to provide mechanical alignment of the at least one laser light source and a windowless ignition port formed in the combustor wall, the at least one laser light source spaced from the windowless ignition port so as to allow fluid communication to create a positive pressure differential between the exterior and interior through the windowless ignition port, the optical beam guidance configured to include optimized optic components to align the laser beam emitted from the at least one laser light source with the windowless ignition port;
transmitting the laser beam through a windowless ignition port formed in a combustor wall defining the combustion chamber and adjacent to a flame region in the combustion chamber, the windowless ignition port configured to provide optimized optical access to the combustion chamber, wherein transmitting the at least one laser beam includes focusing the at least one laser beam on the fuel mixture supplied into a combustion chamber of the internal combustion engine; and
igniting the fuel mixture with the focused laser beam to generate a combustor flame in a flame region.

20. The method of claim 19, wherein the internal combustion engine is a gas turbine engine.

* * * * *